F. G. MOWER.
ORANGE PARER.
APPLICATION FILED SEPT. 24, 1908.
1,008,555.
Patented Nov. 14, 1911.
4 SHEETS—SHEET 1.
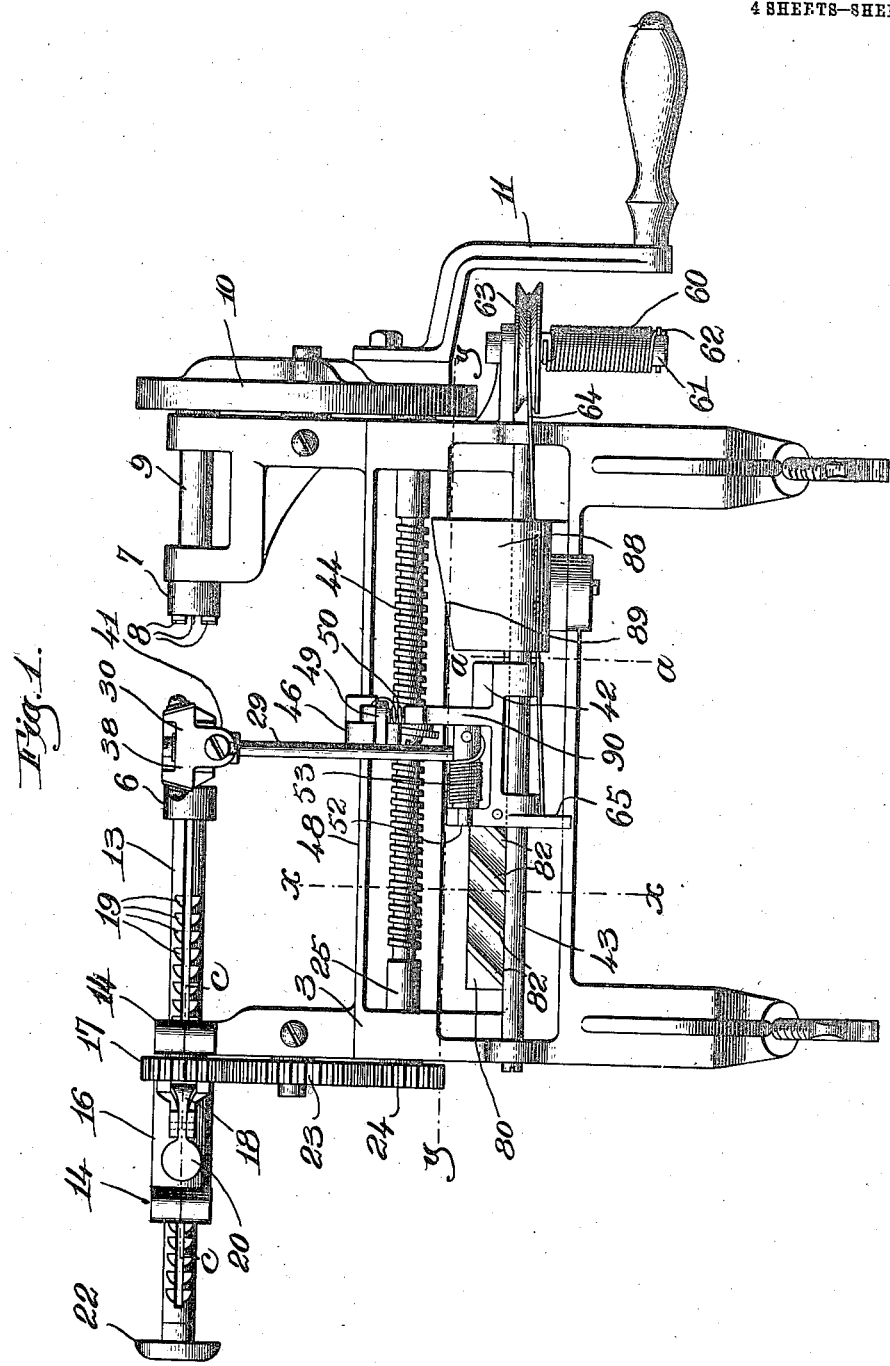
Witnesses.
Thomas J. Drummond
Joseph M. Ward.
Inventor.
Fred G. Mower,
by Crosby Gregory
Atty's F. G. MOWER.
ORANGE PARER.
APPLICATION FILED SEPT. 24, 1908.
1,008,555.
Patented Nov. 14, 1911.
4 SHEETS—SHEET 2.
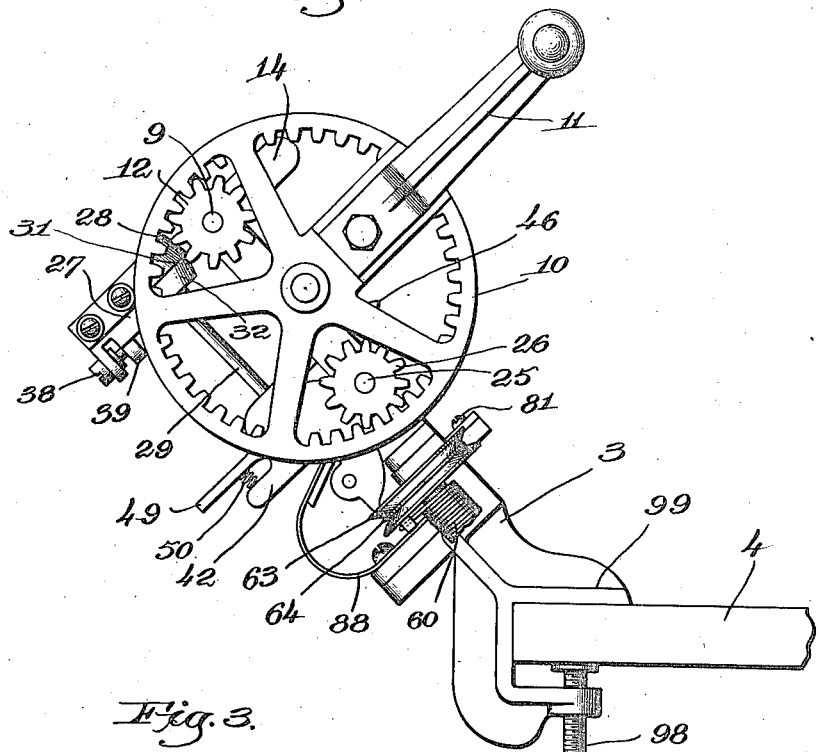
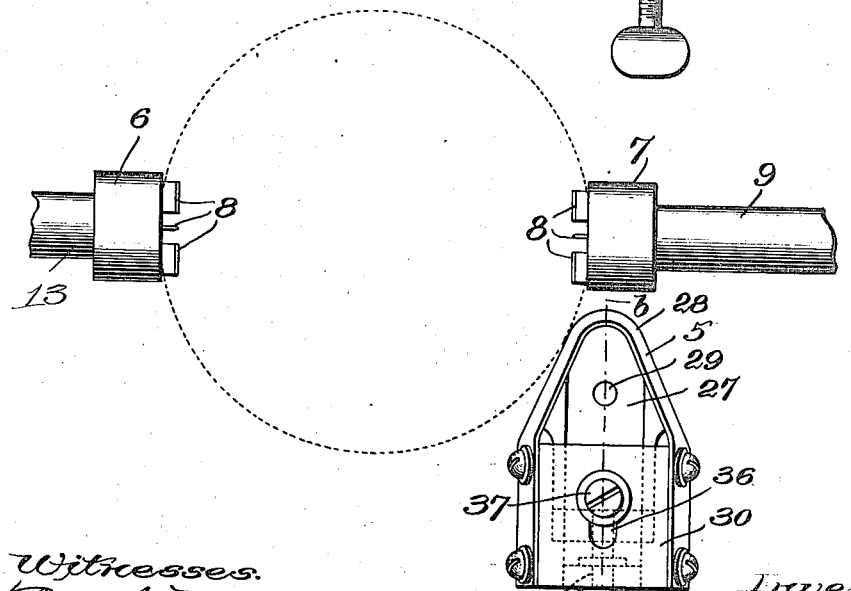
Witnesses.
Thomas J. Drummond
Joseph M. Ward
Inventor.
Fred G. Mower,
by Crosby Gregory
Attys

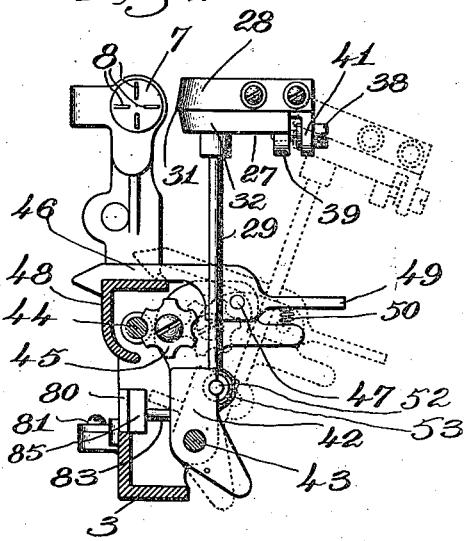
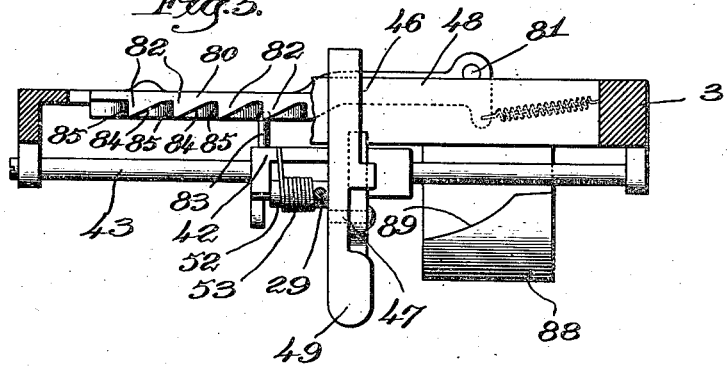
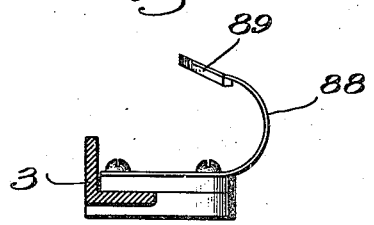

F. G. MOWER.
ORANGE PARER.
APPLICATION FILED SEPT. 24, 1908.
1,008,555.
Patented Nov. 14, 1911.
4 SHEETS—SHEET 4.
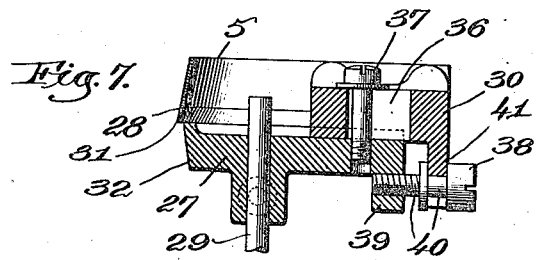
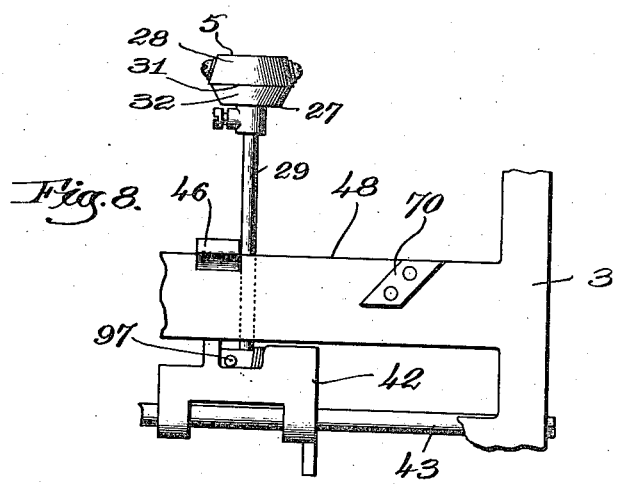
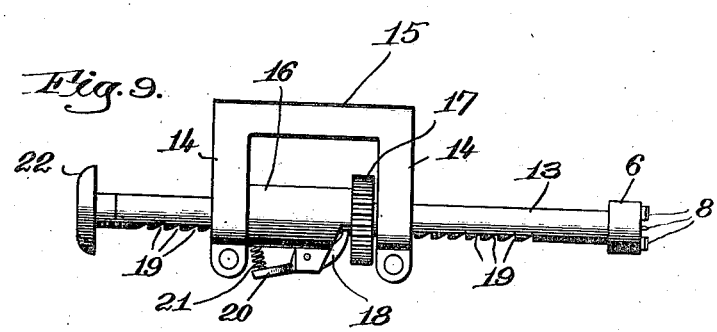
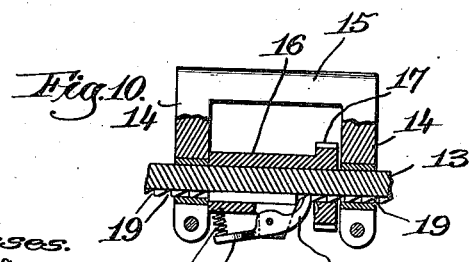
Witnesses.
Thomas J. Drummond
Joseph M. Ward.
Inventor.
Fred G. Mower,
by Crosby Gregory attys.

UNITED STATES PATENT OFFICE.

FRED G. MOWER, OF ANTRIM, NEW HAMPSHIRE, ASSIGNOR TO GOODELL COMPANY, OF ANTRIM, NEW HAMPSHIRE, A CORPORATION OF NEW HAMPSHIRE.

ORANGE-PARER.

1,008,555.             Specification of Letters Patent.      Patented Nov. 14, 1911.

Application filed September 24, 1908. Serial No. 454,565.

*To all whom it may concern:*

Be it known that I, FRED G. MOWER, a citizen of the United States, residing at Antrim, county of Hillsboro, State of New Hampshire, have invented an Improvement in Orange-Parers, of which the following description, in connection with the accompanying drawing, is a specification, like letters on the drawing representing like parts.

This invention relates to machines for paring oranges and it has for its object to provide a novel machine which can be used by extract makers in paring a comparatively thin peeling from the orange so that the oils of the orange peel are made available for producing the orange extract.

Some of the various features of the invention relate to the manner in which the orange is held during the paring operation, the construction of the knife for paring the orange, and the mechanism for operating the knife and returning it to its initial position, all as will be more fully hereinafter described and then pointed out in the claims.

Referring now to the drawings wherein one embodiment of my invention is shown, Figure 1 is a front view thereof; Fig. 2 is an end view looking from the right Fig. 1; Fig. 3 is a fragmentary view showing the manner in which the orange is held and the manner in which the knife operates thereon; Fig. 4 is a section on the line x—x, Fig. 1 looking toward the right; Fig. 5 is a section on the line y—y, Fig. 1; Fig. 6 is a section on the line a—a, Fig. 1; Fig. 7 is a section through the knife on the line b—b, Fig. 3; Fig. 8 is a detail view of the throw-out cam; Fig. 9 is a detail of the bearing for supporting the shaft 13; Fig. 10 is a section on the line c—c Fig. 1.

The frame which supports the paring knife and orange holder is designated by 3 and it may have any suitable or usual construction. In the preferred embodiment of my invention the frame is provided at its lower edge with means for clamping it to the edge of a table 4 which means are so constructed that when the machine is in position it inclines upwardly and forwardly from the table so that the knife 5 overhangs the edge of the table and is situated some distance in front thereof, as best seen in Fig. 2. The advantage of this construction is that a suitable receptacle for receiving the parings can be placed directly beneath the knife and the parings will drop into it as they are cut from the orange.

The means for clamping the machine to the table comprise arms 99 extending from the frame and adapted to rest on top of the table, and clamping screws 98 adapted to engage the under side of the table. These arms and screws are properly disposed relative to the frame to give the latter the desired inclination.

Owing to the formation of an orange it is not practical to support it on a fork as can be done with a fruit which is solid throughout. Accordingly I propose to hold the orange between two holders which are adapted to engage the orange at diametrically opposite points. These holders are constructed with holding faces that embed themselves in the peel of the orange sufficiently to hold the orange firmly when it is acted on by the knife and to cause the orange to rotate when the holders are rotated. Since the orange is sustained at two diametrically opposite points by the two holders, I propose to rotate both of the holders positively, thus eliminating as far as possible all danger of either holder slipping on the orange. The holders are designated by 6 and 7 respectively and they are provided with the comparatively short blades or teeth 8 which are adapted to be embedded into the peel of the orange. The holder 7 is fast on a shaft 9 which is supported in the frame 3 and said shaft is rotated from a driving gear 10 that is shown as provided with a handle 11 for operating it, said driving gear meshing with a pinion 12 that is fast on the shaft 9. The holder 6 is mounted for movement toward and from the holder 7 so that oranges of different sizes may be sustained between the holders. For this purpose the holder is carried by a shaft 13 which is slidably mounted in two separated bearings 14, said bearings being shown as rigidly connected by the yoke 15. The shaft 13 can be moved longitudinally in the bearings 14 toward and from the shaft 9, and said shaft 13 is held in its adjusted position by means of a pawl 18 engaging any one of a plurality of notches 19 formed in the shaft 13. The pawl 18 is shown as pivotally sustained by a hub 16 surrounding the shaft 13 and confined between the bearings 14, said pawl having a thumb piece 20 situated so that by depressing the thumb piece the nose of the pawl is lifted out of engagement with the notches 19 to permit the shaft 13 to be adjusted longitudinally. Said pawl is acted on by a spring 21 which tends to hold it in engagement with the shaft 13. The end of the shaft is provided with a head 22 by means of which the shaft may be adjusted longitudinally. The shaft 13 is rotated positively in unison with the shaft 9 and one way of accomplishing this is that shown in the drawings wherein said shaft 13 has splined thereto a pinion 17 that meshes with and is driven by an idler 23 which in turn meshes with and is driven by a pinion 24 fast on a shaft 25. The shaft 25 extends the length of the frame and has thereon a pinion 26 that meshes with and is driven by the driving gear 10. The relative size of the pinions 25, 24 and 17 is such that the shaft 13 will rotate in unison with the shaft 9, both shafts being driven from the driving gear 10. The pinion 17 may conveniently be rigid with the hub 16 although this is not essential to the invention.

In placing an orange in the machine the pawl 18 is disengaged from the notches 19 and the shaft 13 is withdrawn sufficiently to permit the orange to be placed between the two holders 6 and 7. The shaft 13 is then pushed forwardly sufficiently to bring the holders against the orange and to cause the teeth or blades 8 to be embedded in the orange peel, as shown in Fig. 3, wherein the orange is illustrated in dotted lines. The pawl 18 holds the shaft 13 in this position and the mechanism above described will cause the two shafts to rotate in unison. While the orange is thus held and rotated by the holder it is acted on by the paring knife which operates to cut a thin paring from the orange. The paring knife is mounted to move both longitudinally of the axis of the shafts 9 and 13 and toward and from said axis so that it will adapt itself to the shape of the orange during the paring operation.

In the preferred embodiment of my invention the knife is provided with a substantially U-shaped cutting blade 28 which is adjustably sustained by a head 27 that in turn is carried by a stem 29. The cutting edge 31 of the cutting blade projects slightly beyond the side face 32 of the head, said side face forming in effect a gage which determines the thickness of the paring, said thickness being determined by the distance which the cutting edge 31 projects beyond the face 32. Provision is made for adjusting the blade relative to the head thereby to vary the thickness of the paring and this is accomplished herein by securing the blade to a holder 30 and making the holder adjustable on the head. Said holder is shown as provided with a slot 36 through which a clamping screw 37 extends, said screw having screw-threaded engagement with the head 27 and thus serving to clamp the holder in adjusted position. The adjustment of the holder is effected by means of an adjusting screw 38 which is shown as having screw-threaded engagement with a lug 39 formed on the head 27 and the head of which screw is provided with a groove 40 that is embraced by a fork 41 carried by the holder. When the adjusting screw is turned in either direction the holder will be adjusted on the head, thus varying the distance between the guard face 32 and the cutting edge of the blade. The knife is sustained by a carriage 42 that is mounted to move in a direction parallel with the axis of the shafts 9, 13. This carriage is shown as slidably sustained on a rod 43 which extends the length of the frame, said carriage also being capable of turning movement on the rod. The carriage is given its longitudinal movement by means of a feed screw 44 which is adapted to engage a nut 45 sustained by the carriage. The feed screw is preferably operated by the driving gear 10 and it may conveniently be formed on the shaft 25 that supports the gears 24, 26, although this is not essential. The nut 45 does not completely surround the shaft 44 but merely has engagement with one side of the shaft, as plainly seen in Fig. 4. Said nut is normally held in engagement with the shaft by means of a latch 46 which is pivoted to the carriage at 47 and the nose of which hooks over the longitudinally-extending bar 48 of the frame, as seen best in Figs. 4 and 5. Said latch is shown as having integral therewith a thumb piece 49 by means of which the nose can be disengaged from the bar 48, and a spring 50 is employed for normally holding the latch in engagement with the frame. The knife is yieldingly sustained by the carriage so that said knife can move backwardly as it passes over and pares the portion of the orange of largest diameter. This may conveniently be done by pivotally connecting the stem of the knife to the frame 42 as by providing said stem at its lower end with a rock shaft 52 which is mounted in bearings in the frame. A spring 53 which encircles the rock shaft tends normally to keep the knife in yielding contact with the latch. A projection 97 extending from the rock shaft serves to limit the movement of the knife toward the axis of the shafts 9 and 13.

When an orange is placed in the machine the knife will be situated toward the right of the machine in Fig. 1 or opposite the holding device 7, as seen in Fig. 3. After the orange is properly sustained by the holders the rotation of the handle 11 will cause the orange to rotate and will at the same time feed the carriage 42 to the left Fig. 1, thus bringing one side of the blade against the orange, as seen in Fig. 3. As the carriage continues its movement toward the left the knife yields backwardly as it passes over the part of the orange of largest diameter and then swings forwardly again as it completes the paring of the orange. It will be noted that the knife does not turn about its vertical axis to present the same part of the cutting edge at all times to the orange, but that when the knife first engages the orange the paring is done by one side of the blade, as seen in Fig. 3, and as the knife passes around the part of the orange of largest diameter the paring is done by the point of the blade, while during the completion of the paring operation the paring is done by the other side of the blade from that which is shown in engagement with the orange in Fig. 3.

My invention also contemplates means for automatically returning the knife to its initial position when the orange has been completely pared. This is done in the present embodiment by automatically disengaging the nut 45 from the screw 44 and moving the carriage backwardly to the right Fig. 1 by means of a spring. Said spring is shown at 60 and it is a coiled spring wound about a fixed stud 61 sustained by the frame and having one end fixed to the stud as at 62. The other end of the spring is connected to a pulley 63 that is loosely mounted on the stud and said pulley has connected thereto one end of a cord 64, the other end of which is connected to the carriage 42, as at 65. As the carriage is moved to the left Fig. 1 the cord is unwound from the pulley 63 and the rotation of the latter winds up the spring 60. When the carriage has completed its movement to the left and the orange is completely pared the nut 45 is disengaged from the screw 44 and the spring 60 by its resiliency serves to wind up the cord 64 on the pulley 63 and thus return the carriage to its initial position. For automatically disengaging the nut 45 from the screw 44 I have provided a throw-out cam 70, see Fig. 8, which is fast on the bar 48 and which is situated to be engaged by the nose of the latch 46 when the latter has completed its movement to the left Fig. 1. The return movement of the carriage is a comparatively quick one and it is desirable that during such return movement the knife should be swung backwardly far enough so that it will not strike the orange, for otherwise it would be likely to knock the orange out from between the holders. My invention, therefore, contemplates means constructed to swing the knife backwardly during the return movement. The means herein shown for accomplishing this comprises a plate 80 pivoted to the frame at 81 and carrying on its face a plurality of inclined ribs 82, and a pin or projection 83 extending from the carriage 42 a sufficient distance to engage the ribs. The ribs 82 have the inclined faces 84 and the straight faces 85. When the carriage moves to the left Figs. 1 and 5 the projection 83 engages the inclined faces 84 of the ribs and merely forces the plate 80 back sufficiently to allow the pin 83 to pass. When the carriage moves to the right, however, the pin or projection 83 engages the square face of one of the ribs and owing to the inclined position of the rib said pin rides up the square face and thus swings the carriage back into the dotted line position Fig. 4, thus carrying the knife out of engagement with the orange. The backward movement of the knife carriage is a rapid one and as a result when the pin has engaged any of the ribs 82 and the carriage has been thrown backwardly, said carriage will be returned to its initial position before it has time to again swing forwardly. Consequently one rib 82 would answer the purpose desired, but I prefer to employ a plurality of ribs so that if the pin does not strike one rib it will strike another.

Another advantage of using a plurality of the ribs 82 is that if a small fruit is being pared so that the paring operation will be completed before the knife travels the full length of its stroke, it may be desirable to release the latch 46 by hand without moving the knife to the end of its stroke. When this is done the pin 83 will strike one of the ribs 82 and will throw the carriage backbackwardly as above described.

When the knife has been returned to its initial position it is necessary that the carriage should be swung forwardly again into a position to permit the latch to be reëngaged with the bar 48. My invention, therefore, includes a device for automatically swinging the carriage forward again after its return to its initial position thereby bringing the latch 46 into engagement with the bar 48. This is done herein by the positioning device 88 which has the cam edge 89 and is situated to be engaged by the portion 90 of the carriage as the latter completes its rearward movement. The engagement of the carriage with the cam edge throws the carriage forward again to cause the latch to reëngage the bar 48 as will be obvious. The positioning device 88 is preferably made slightly resilient so that there will be no danger of breaking any of the parts by the impact of the carriage against said positioning device. The latch 46 can be disengaged from the bar 48 manually at any point during the travel of the carriage by simply depressing the thumb piece 49 as will be plainly seen from Fig. 4.

In paring an orange it is simply necessary to insert the orange between the holders as above described and then to operate the driving gear by means of the crank 11. When the movement of the carriage toward the left Figs. 1 and 5 results in paring the orange and when the knife carriage has completed its movement, it is automatically returned to its initial position ready to begin on an unpared orange. The operator then removes the pared orange from the holders and inserts another orange and the operation is repeated.

Having fully described my invention, what I claim as new and desire to secure by Letters Patent is:—

1. In a fruit parer, the combination with a frame having means to sustain and rotate fruit, of a rod sustained by the frame, a knife carriage slidably mounted on said rod, a paring knife on said carriage, a feed screw for moving the carriage forward, automatic means to disconnect the carriage from the feed screw at the end of its forward stroke, a spring to return the carriage to its initial position, means to turn the carriage on the rod during its backward movement so as to carry the knife out of the way of the fruit, and a positioning device situated to be engaged by the carriage as it completes its backward movement and adapted to throw the carriage bodily forward into engagement with the feed screw.

2. In a fruit parer, the combination with a frame having means thereon to sustain and rotate fruit, of a rod extending longitudinally of the frame, a knife carriage mounted to slide on the rod and also mounted to turn thereabout, a knife sustained by said carriage, a screw for moving the carriage, the weight of the carriage tending normally to swing it in a direction to be disengaged from the screw, means to hold the carriage in engagement with the screw, means rendered operative by the forward movement of the carriage to release said holding means whereby the carriage will be automatically disconnected from the screw, a spring to return the carriage to its initial position when it is disengaged from the screw, and a positioning device situated to be engaged by the carriage as the latter returns to its initial position thereby to throw the carriage automatically into engagement with the screw again.

3. In a fruit parer, the combination with means to sustain and rotate fruit, of a knife carriage, a paring knife sustained thereby, a feed screw for feeding the carriage forward, a latch pivoted to the carriage and adapted to hold said carriage in engagement with the feed screw, automatic means to release said latch, and a spring to return the carriage to its initial position when the latch is released, said latch having one end formed to constitute a thumb-piece by which the latch can be released manually.

4. In a fruit parer, the combination with a frame, of a feed screw thereon, means to sustain and rotate fruit, a knife carriage slidably mounted on the frame, a latch sustained by the carriage and engaging the frame for holding the carriage in operative engagement with the feed screw, means to automatically disengage the latch at the end of the forward movement of the carriage, a spring to return said carriage to its initial position, and means acting to positively throw the carriage backward during its return movement whereby the knife will be carried out of the way of the fruit.

5. In a fruit parer, the combination with a frame having means to sustain and rotate fruit, of a knife carriage slidably mounted on the frame and having a projection extending laterally therefrom, a knife sustained by the carriage, a feed screw for feeding the carriage forward, means to disengage the carriage from the feed screw at the end of its feeding movement, a spring to return the carriage to its initial position, and an inclined cam rib situated to be engaged by said projection during the return movement of the carriage thereby to throw the carriage positively back out of the way of the fruit.

6. In a fruit parer, the combination with means to sustain and rotate fruit, of a knife carriage having a projection extending laterally therefrom, a knife sustained by the carriage, a feed screw for feeding the carriage forward, a spring to return the carriage to its initial position, and a yieldable plate having an upwardly-inclined rib situated to be engaged by said projection during the return movement of the carriage whereby the knife is thrown back out of the way of the fruit.

7. In a fruit parer, the combination with means to sustain and rotate fruit, of a knife carriage having a projection extending laterally therefrom, a knife sustained by the carriage, a feed screw for feeding the carriage forward, a spring to return the carriage to its initial position, and a pivoted plate having a plurality of upwardly-inclined ribs situated to be engaged by said projection during the return movement of the carriage whereby the knife is thrown back out of the way of the fruit.

8. In a fruit parer, the combination with means to sustain and rotate fruit, of a knife carriage, a knife sustained thereby, a feed screw to feed the knife carriage forward, means to hold the carriage in engagement with the feed screw, means rendered operative automatically at the end of the forward stroke to release said holding means, means to return said carriage to its initial position, means rendered operative by the backward movement of the carriage to throw the latter away from the fruit during such movement, and a positioning device situated to be engaged by the carriage during its return movement and adapted to move the carriage forwardly into engagement with the feed screw.

9. In a fruit parer, the combination with two axially-alined shafts, of a holding device sustained by each shaft, one of said shafts being adjustable longitudinally toward and from the other, a yoke-shaped bearing for said shaft, a locking device sustained by the shaft between the arms of the bearing for preventing backward movement of said shaft, means to rotate both shafts, a knife carriage, and a knife thereon.

10. In a fruit parer, the combination with two axially-alined shafts, of a fruit-holding device sustained by each shaft, means to rotate both shafts, one of said shafts being adjustable longitudinally toward and from the other, a yoke-shaped bearing for said shaft, a sleeve splined to the shaft and situated between the arms of the bearing, and a locking pawl carried by said sleeve and adapted to engage notches in the shaft whereby said shaft is locked against backward movement while being permitted to freely rotate.

11. In a fruit parer, the combination with two axially-alined shafts, of a fruit-holding device sustained by each shaft, one of said shafts being adjustable longitudinally toward and from the other, a driving gear splined to said latter shaft, means to rotate said gear, and means to lock the shaft against backward movement while permitting it to rotate freely.

12. In a fruit parer, the combination with two axially-alined shafts each having a fruit-holding device thereon, of bearings for each shaft, one of said shafts being adjustable longitudinally toward and from the other in its bearings, means to rotate said shafts in unison, a paring knife, and a locking device to lock the adjustable shaft against longitudinal movement in its bearings while permitting it to rotate freely.

13. A knife for a fruit parer comprising a head having a U-shaped gaging face and a flap top, a holder resting on the flat top and provided with a forked lug, an adjusting screw journaled in said lug and having screw-threaded engagement with the head whereby the holder may be adjusted, and a U-shaped cutting blade carried by said holder.

14. A knife for a fruit parer comprising a head having a U-shaped gaging face, a holder separate from said head and movably mounted thereon, a U-shaped blade carried by the holder, and an adjusting screw journaled in the holder and screw-threaded into the head, said holder being slotted, and a guide pin carried by the head and extending through the slot in the holder.

In testimony whereof, I have signed my name to this specification, in the presence of two subscribing witnesses.

FRED G. MOWER.

Witnesses:
F. JENNIE RALCH,
HENRY A. HURLIN.